United States Patent [19]

Takahashi

[11] Patent Number: 4,746,936

[45] Date of Patent: May 24, 1988

[54] INK JET PEN

[75] Inventor: Hiroshi Takahashi, Yokohama, Japan

[73] Assignee: Canon Kabushiki Kaisha, Tokyo, Japan

[21] Appl. No.: 61,774

[22] Filed: Jun. 15, 1987

Related U.S. Application Data

[63] Continuation of Ser. No. 926,880, Nov. 5, 1986, abandoned, which is a continuation of Ser. No. 738,547, May 28, 1983, abandoned, which is a continuation of Ser. No. 449,502, Dec. 13, 1982, abandoned.

[30] Foreign Application Priority Data

Dec. 22, 1981 [JP] Japan .................................. 56-206113

[51] Int. Cl.$^4$ ............................................ G01D 15/16
[52] U.S. Cl. .............................. 346/140 R; 346/140 A; 346/143; 401/195
[58] Field of Search ................ 346/140 R, 140 A, 143, 346/75; 401/195

[56] References Cited

U.S. PATENT DOCUMENTS

| | | | |
|---|---|---|---|
| 4,025,928 | 5/1977 | Hou | 346/140 |
| 4,028,540 | 6/1977 | Key | 362/118 |
| 4,065,775 | 12/1977 | Hou | 346/140 R |
| 4,168,533 | 9/1979 | Schwartz | 346/75 X |
| 4,377,741 | 3/1983 | Brekka | 235/472 |
| 4,399,488 | 8/1983 | Rowe | 361/398 X |
| 4,412,232 | 10/1983 | Weber | 346/140 R |

Primary Examiner—Joseph W. Hartary
Attorney, Agent, or Firm—Fitzpatrick, Cella, Harper & Scinto

[57] ABSTRACT

An ink jet pen, which is a pen-like writing utensil utilizing an ink jet method of recording, comprises a tubular casing, incorporating means for ink emission and equipped with means for controlling ink emission. In a representative embodiment, the tubular casing is composed of two tubes which are mutually rotatable for controlling the ink emission.

13 Claims, 3 Drawing Sheets

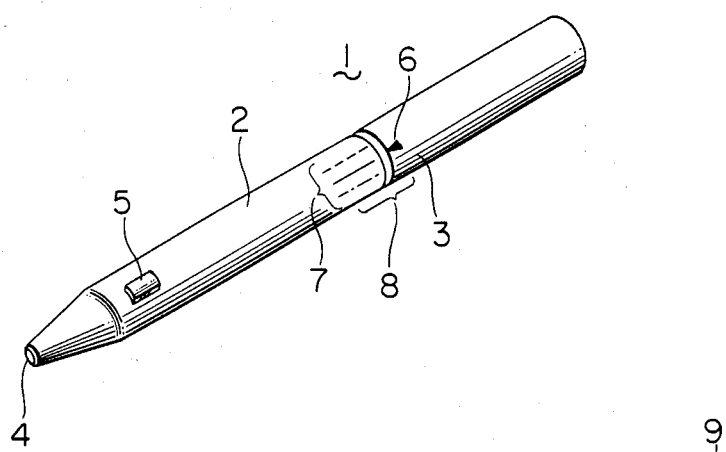
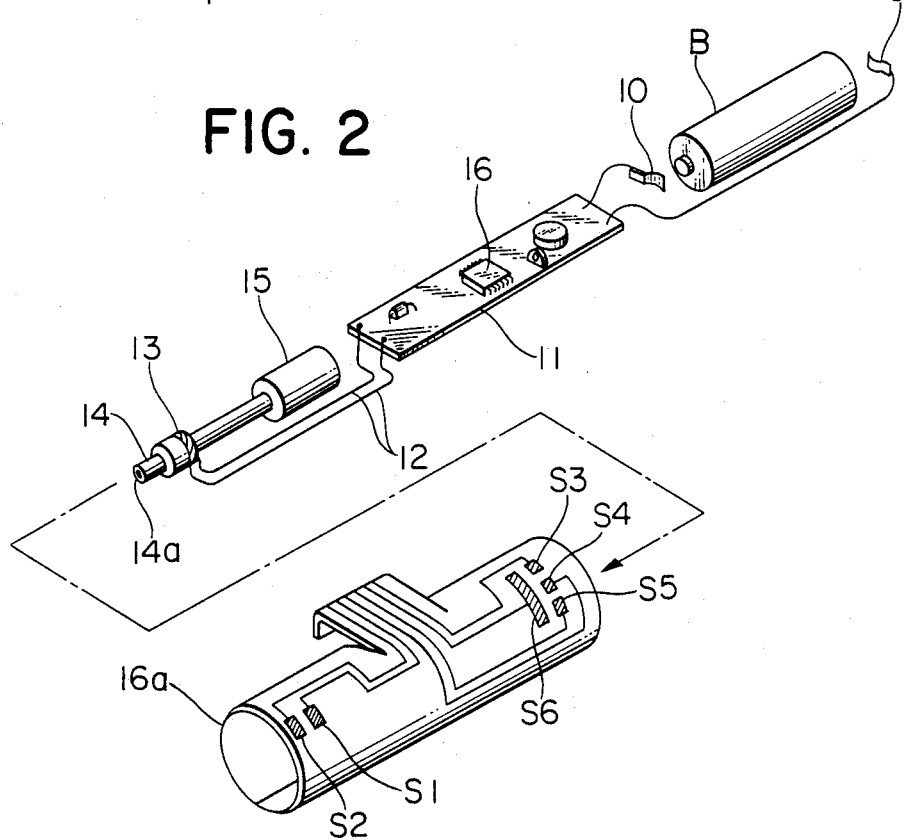

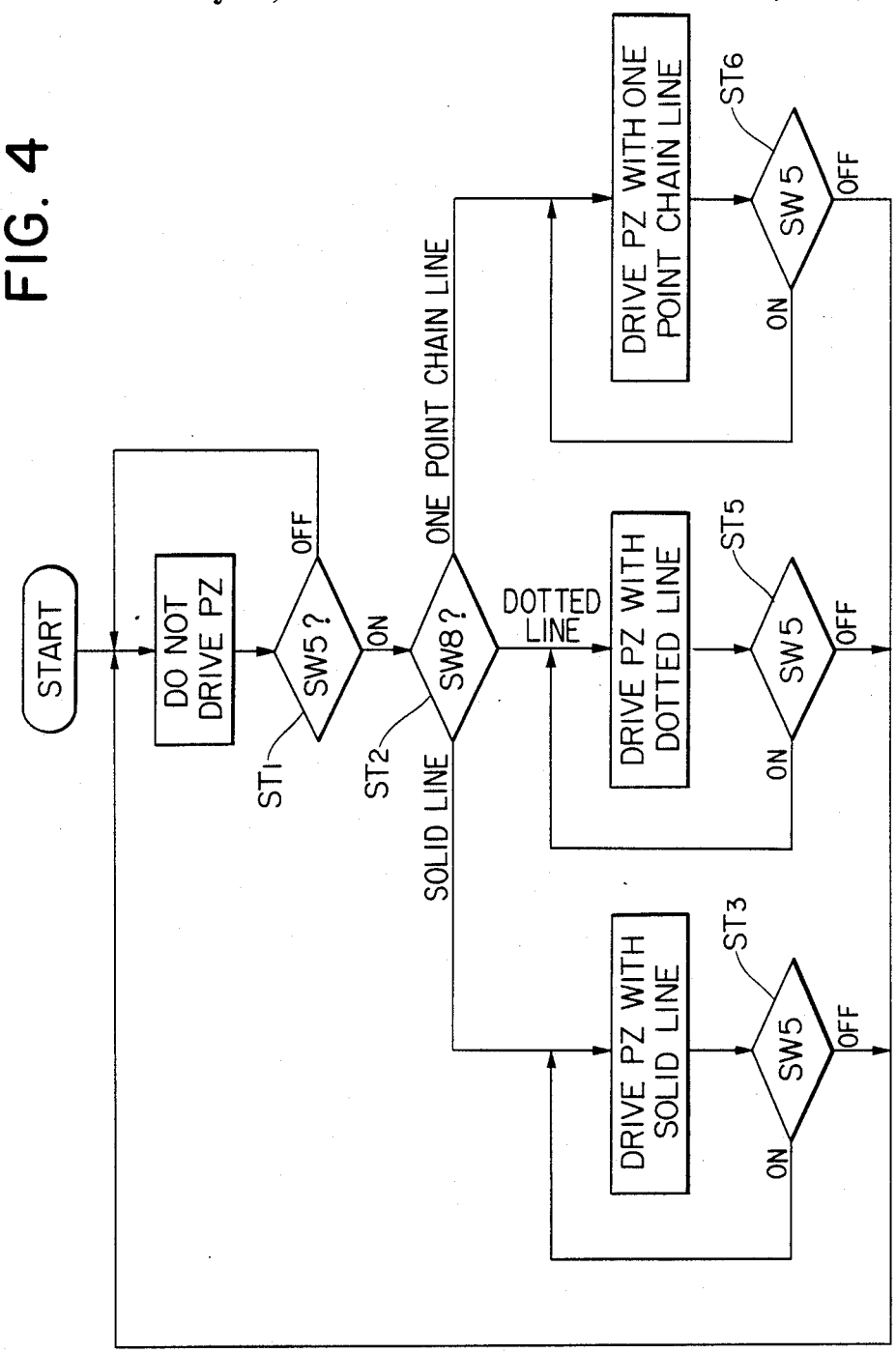

INK JET PEN

This application is a continuation of application Ser. No. 926,880 filed Nov. 5, 1986, which is a continuation of application Ser. No. 738,547, filed May 28, 1985, which is a continuation of application Ser. No. 449,502, filed Dec. 13, 1982, each now abandoned.

BACKGROUND OF THE INVENTION

1. Field of the Invention

The present invention relates to an ink jet pen, and more particularly to an ink jet pen constructed as a pen-like writing utensil and utilizing an ink method for recording.

2. Description of the Prior Art

There are already known various writing utensils such as pencils, fountain pens, ball-point pens, and the like, all of which require considerable writing pressure for recording and are therefore not suitable for recording on soft objects such as fruits, or on coarse surfaces such as concrete or stone.

Also writing a broken line or a chain line with such writing utensil requires an extremely tedious operation of repeatedly lowering and lifting the writing utensil.

SUMMARY OF THE INVENTION

The present invention has been devised in order to overcome the drawbacks of such conventional writing utensils as mentioned above. An object of the present invention is to provide an ink jet pen capable of contact-free recording practically without writing pressure on almost any object, and capable of writing a broken line or the like without a lifting operation relative to the object being written on.

Another object of the present invention is to provide an ink jet pen of a structure having a power source, a control circuit, an ink tank, a piezoelectric element for ink emission all incorporated in a penlike casing.

Still another object of the present invention is to provide an ink pen capable of recording by selecting a recording mode with a switch operation and by accordingly emitting ink droplets toward an object.

Still another object of the present invention is to provide a novel recording utensil capable of recording on any object with an arbitrarily selectable recording mode.

Still another object of the present invention is to provide an ink jet pen comprising:

casing means composed of a first tubular member and a second tubular member rotatable relation thereto;

control means housed in said casing means and adapted to detect the rotational position of said second tubular member with respect to said first tubular member thereby controlling the state of ink emission; and emitting means housed in said casing means and adapted to effect said ink emission under the control of said control means.

Still another object of the present invention is to provide an ink jet pen comprising:

casing means composed of a first tubular member and a second tubular member rotatable relation thereto;

selecting means for selecting the state of ink emission according to the rotational position of said second tubular member with respect to said first tubular member;

control means housed in said casing means and adapted to control the ink emission for achieving a state selected by said selecting means; and emitting means housed in said casing means and adapted to effect said ink emission under the control of said control means.

Still another object of the present invention is to provide an ink jet pen comprising:

casing means constructed as a tubular member;

switching means provided on said casing means;

control means housed in said casing means and adapted to control the ink emission according to the switching operation of said switching means; and emitting means housed in said casing means and adapted to effect said ink emission under the control of said control means.

Still another object of the present invention is to provide an ink jet pen comprising:

casing means composed of a first tubular member and a second tubular member rotatable relation thereto;

selecting means for selecting the state of ink emission according to the rotational position of said second tubular member with respect to said first tubular member;

signal generating means housed in said casing means and adapted to generate drive signals corresponding to the state of ink emission selected by said selecting means; and emitting means housed in said casing means and adapted to effect said ink emission in response to the drive signals from said signal generating means.

BRIEF DESCRIPTION OF THE DRAWINGS

The attached drawing figures illustrate an embodiment of the present invention, wherein FIG. 1 is a external perspective view thereof;

FIG. 2 is an exploded perspective view of the drive mechanism;

FIG. 4 is a flow chart showing the function of the embodiment.

DETAILED DESCRIPTION OF THE PREFERRED EMBODIMENT

Figure 3:
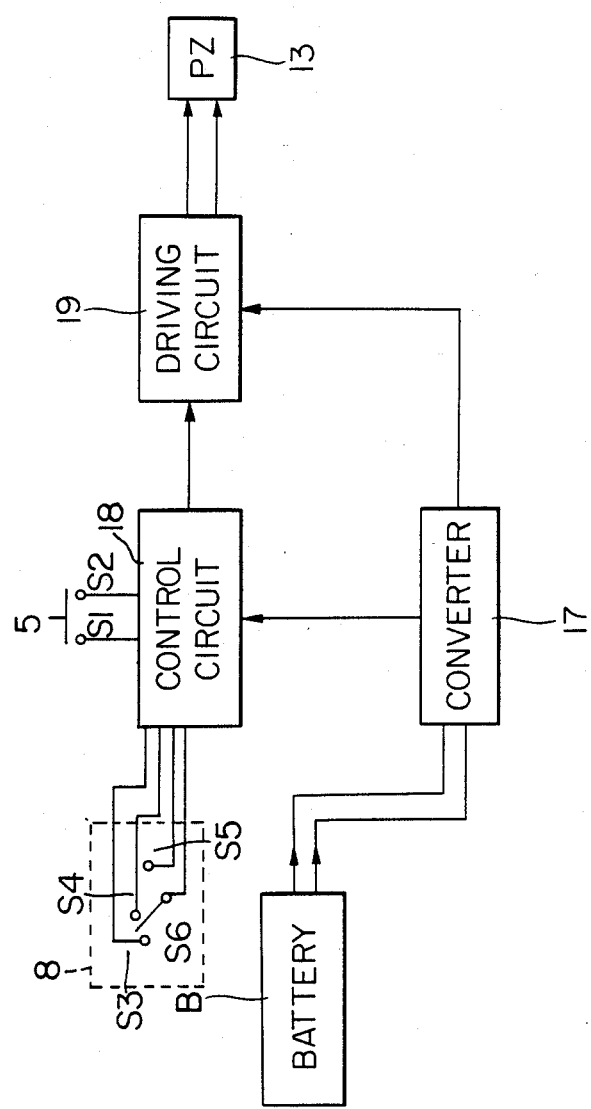
FIG. 3 is a block diagram of the control circuit.

Now the present invention will be explained in detail with reference to a preferred embodiment thereof shown in the attached drawings.

FIG. 1 is an external view of the ink jet pen 1 of the present invention, generally having the shape of a pen said which is composed of a first tubular member 2 and a second tubular member 3 rotatably connected to and behind the first tubular member. The pen 1 is provided with an ink emitting aperture 4 at the front end of said first tubular member 2 and a pushbutton switch 5, for causing ink emission, positioned close to the aperture 4.

The second tubular member 3 positioned at the rear part of the pen, when rotated relative to the first tubular member, changes over a switch 8. By matching a mark 6 provided on the member 3 with one of several selection indicators 7 provided on the first tubular member 2 the switch selects a given species of line to be recorded, and the ink is emitted in response to the actuation of the push-button switch 5 to write the line selected by the switch 8.

In the first and second tubular members 2, 3 there are housed components and circuits as shown in FIG. 2.

In FIG. 2, a battery B is connected through contact plates 9, 10 to an oblong printed circuit board 11.

On said printed circuit board 11 there are provided semi-conductor components 16 and other components constituting a voltage elevating circuit for elevating the voltage of the battery B and a control circuit for controlling the entire apparatus.

Also said printed circuit board 11 is connected, through lead wires 12, to a piezoelectric element 13 for causing ink emission. Said piezoelectric element 13 is mounted on a nozzle 14 which is connected to an ink tank 15. The ink is not emitted from an aperture 14a of the nozzle 14 in the normal state because of the surface tension of the ink, but, upon energization, the piezoelectric element 13 is deformed to compress the nozzle 14 thereby emitting a determined amount of the ink.

A flexible printed circuit board 16a is rolled into a cylindrical form, and on the external periphery of the board 16a there are provided contacts S1, S2 to be selected by the aforementioned switch 5, and contacts S3, S4, S5, and S6 to be selected by the rotation of the second tubular member 3 relative to the first 2. The patterns constituting said contacts are connected, through circuit patterns formed on said flexible circuit board 16a to the printed circuit board 11.

Upon depression of the push-button switch 5, a conductor provided thereunder touches the contacts S1, S2 simultaneously to close a circuit.

The contacts S3, S4, and S5 correspond to the selection indicators 7 indicating the species of line and are selectively connected with a common contact S6 by the rotation of the second tubular member 3 relative to the first to vary the mode of ink emission.

FIG. 3 is a block diagram showing the control system, wherein a converter 17 elevates the voltage of the battery B for generating a voltage required for driving the control system.

A control circuit 18 detects the status of the switches and supplies corresponding signals to a driving circuit 19 for the piezoelectric element 13.

Now reference is made to FIG. 4 showing a flow chart indicating the function of the ink jet pen of the above-described structure.

At first the control circuit 18 identifies the state of the switch 5, and, if it is open, it does not activate the piezoelectric element 13 in a step ST1. On the other hand, if the switch 5 is closed, the control circuit identifies the state of the second tubular member 3 relative to the first and hence the state of the other switch 8 in a step ST2. The control circuit 18 then controls the piezoelectric element 13 for writing a solid line if the switch 8 selects the solid line, then identifies the state of the switch 5 in a step ST3, and continues the control for writing the solid line if said switch is closed. On the other hand the control circuit returns to the original state if said switch 5 is open. Similarly according to the identification of the writing mode in the step ST2, a control state for writing a broken line or a chain line is respectively attained by a step ST5 or ST6.

A control state for solid line writing is, for example, achieved by the supply of pulses of 500 Hz from the control circuit 18 to the driving circuit 19, whereby said driving circuit 19 is switched at a frequency of 500 Hz to energize the piezoelectric element 13, thereby causing a corresponding vibration thereof and emitting ink droplets 500 times a second.

Ink emissions at such intervals constitute a continuous solid line at usual writing speed.

Also a control state for broken line writing is achieved by intermittently repeating the above-described solid line writing for example at an interval of 0.1 seconds, and a control state for chain line writing is achieved by effecting the solid line writing for example for 0.3 seconds followed by a pause of 0.1 seconds, then said writing again for 0.1 seconds followed by a pause of 0.1 seconds, and repeating these states.

I claim:

1. An ink jet pen, comprising:
   a pen-shaped case;
   an ink emission means housed within a portion of said case;
   an ink emission control means for controlling said ink emission means housed within said case, wherein said ink emission control means stores a plurality of ink emission patterns and includes an ink emission pattern switch for selecting one of said ink emission patterns;
   a switch means provided on the outer surface of said case, said switch means being connected to the ink emission control means for instructing said ink emission means to emit ink; and
   power source means housed within said case for supplying power to said ink emission means and said ink emission control means.

2. The ink jet pen according to claim 1, wherein said ink emission pattern switch is rotatable, whereby said ink emission patterns are selected by rotating a part of said case.

3. The ink jet pen according to claim 1, wherein said power source means includes a battery.

4. An ink jet pen according to claim 1, wherein said ink emission control means is provided on an outer surface of said portion of said case.

5. An ink jet pen, comprising:
   a pen-shaped case;
   an ink emission means housed within said case, said ink emission means being a piezoelectric device;
   an ink emission control means for controlling said ink emission means housed within said case, wherein said ink emission control means stores a plurality of ink emission patterns and includes an ink emission pattern switch for selecting one of said ink emission patterns;
   a switch means provided on the outer surface of said case, said switch means being connected to the ink emission control means for instructing said ink emission means to emit ink; and
   power source means housed within said case for supplying power to said ink emission means and said ink emission control means.

6. An ink jet pen according to claim 5, wherein said ink emission patterns include a continuous ink emission pattern and an intermittent ink emission pattern.

7. An ink jet pen, comprising:
   a pen shaped case having at least two mutually rotatable sections;
   an ink emission means housed within said case;
   an ink emission control means housed within said case for controlling said ink emission means to emit ink in one of a plurality of ink emission patterns; and
   an ink emission pattern switch for selecting one of said ink emission patterns by rotation of one section of said case relative to another section of said case.

8. The ink jet pen according to claim 5, further comprising switch means for instructing said ink emission control means to emit ink.

9. The ink jet pen according to claim 5, wherein said ink emission patterns include a continuous ink emission pattern and an intermittent ink emission pattern.

10. The ink jet pen according to claim 5, further comprising a battery housed within said case for powering said ink emission means.

11. An ink jet pen, comprising:

a pen-shaped case defining a longitudinal axis;

an ink emission means housed within a portion of said case;

an ink emission control means housed within said case for controlling said ink emission means;

radially engageable switch means extending from an outer surface of said portion of said case and activated by a radially inward movement thereof for instructing said ink emission means to emit ink; and power source means housed within said case for supplying power to said ink emission means and said ink emission control means.

12. An ink jet pen according to claim 11, wherein said ink emission control means stores a plurality of ink emission patterns and said ink jet pen further comprises a selection switch for selecting one of the ink emission patterns stored by said ink emission control means.

13. An ink jet pen according to claim 11, wherein said ink emission means comprises a piezoelectric device.

* * * * *

UNITED STATES PATENT AND TRADEMARK OFFICE
CERTIFICATE OF CORRECTION

PATENT NO. : 4,746,936
DATED : May 24, 1988
INVENTOR(S) : HIROSHI TAKAHASHI

It is certified that error appears in the above-identified patent and that said Letters Patent is hereby corrected as shown below:

COLUMN 1

Line 39, "penlike" should read --pen-like--.
    Line 41, "ink pen" should read --ink jet pen--.
    Line 51, "relation" should read --relative--.
    Line 62, "relation" should read --relative--.

COLUMN 2

Line 17, "relation" should read --relative--.
    Line 51, "pushbutton" should read --push-button--.

COLUMN 4

Line 53, "pen shaped" should read --pen-shaped--.
    Line 63, "claim 5," should read --claim 7,--.
    Line 66, "claim 5," should read --claim 7,--.

UNITED STATES PATENT AND TRADEMARK OFFICE
CERTIFICATE OF CORRECTION

PATENT NO. : 4,746,936

DATED : May 24, 1988

INVENTOR(S) : HIROSHI TAKAHASHI

It is certified that error appears in the above-identified patent and that said Letters Patent is hereby corrected as shown below:

COLUMN 5

Line 1, "claim 5," should read --claim 7,--.

Signed and Sealed this

Twenty-fourth Day of January, 1989

Attest:

DONALD J. QUIGG

Attesting Officer   Commissioner of Patents and Trademarks